(No Model.)
O. B. SHALLENBERGER & H. M. BYLLESBY.
SYSTEM OF ELECTRICAL DISTRIBUTION.
No. 434,162.  Patented Aug. 12, 1890.
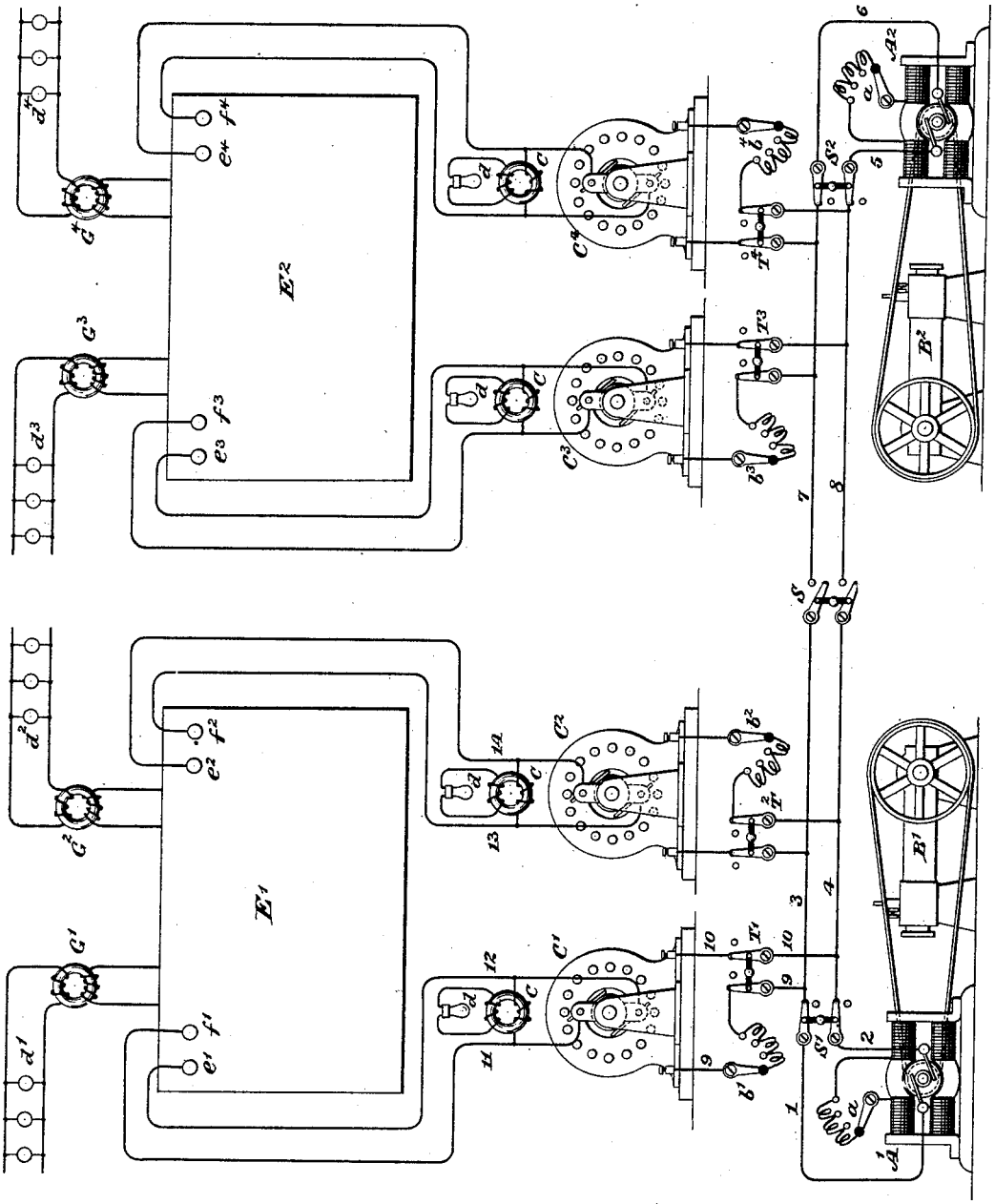
Witnesses
Caroline E. Dardan
Geo M Phelps Jr.
Inventors
O. B. Shallenberger
H. M. Byllesby
By their Attorneys
Pope Edgecomb & Terry

UNITED STATES PATENT OFFICE.

OLIVER B. SHALLENBERGER, OF ROCHESTER, AND HENRY M. BYLLESBY, OF PITTSBURG, ASSIGNORS TO THE WESTINGHOUSE ELECTRIC COMPANY, OF PITTSBURG, PENNSYLVANIA.

SYSTEM OF ELECTRICAL DISTRIBUTION.

SPECIFICATION forming part of Letters Patent No. 434,162, dated August 12, 1890.

Original application filed January 21, 1888, Serial No. 261,456. Divided and this application filed April 9, 1888. Serial No. 270,064.
(No model.)

*To all whom it may concern:*

Be it known that we, OLIVER B. SHALLENBERGER and HENRY M. BYLLESBY, citizens of the United States, residing, respectively, in Rochester, Beaver county, and in Pittsburg, Allegheny county, both in the State of Pennsylvania, have jointly invented certain new and useful Improvements in Central Stations for Alternate-Current Systems of Electrical Distribution, (Case No. 207,) of which the following is a specification.

The invention relates to an organization of circuits and apparatus at the central station of a system of distribution employing alternating, intermittent, or pulsatory electric currents.

The invention consists, generally, in organizing apparatus in substantially the following manner: A suitable number of dynamo-electric generators are employed, say four. These have their field-magnets supplied by currents from two separate exciters, each provided with its own driving-engine. The field-magnets are connected in multiple arc with their respective exciters, and the generators are independently regulated. The exciters may be of such capacity that either one may serve to supply the currents necessary for the entire system of alternate-current generators.
Suitable switch and circuit controlling devices are employed for connecting the exciting devices in multiple arc with each other for the purpose of supplanting either one by the other. The several alternate-current generators are connected with their work-circuits in multiple arc or parallel circuit, and each has its own ammeter and voltmeter for determining the current. Each alternate-current generator is provided with a switch whereby it may be thrown into and out of circuit, and each has a double-pole or two-way switch for connecting with either of two sets of feeders or main lines. Preferably, also, each generator is provided with a single light connected in the secondary circuit of a converter, the primary of which is connected across the poles of the generator, and this light is used as an indicator or pilot light. The distributing-wires leading to the work-circuits are connected with the trunk-wires through suitable double-pole switches.

This application is a division of a case filed January 21, 1888, Serial No. 261,456.

In the accompanying drawing there is shown an organization of circuits and apparatus adapted to carry out the invention.

Referring to the figure, A' and A² represent two continuous-current generators, driven, respectively, by engines B' and B², of any suitable character, and each generator is provided with an adjustable resistance $a$, by means of which the current from the generator may be regulated. The respective poles of the generator A' are connected by conductors 1 and 2, through a switch S', with conductors 3 and 4, respectively. The poles of the generator A² are connected by conductors 5 and 6, through a switch S², with the conductors 7 and 8, respectively. The conductors 3 and 7 and 4 and 8 may be connected with each other by means of a switch S, thus placing the two generators in circuit with each other when it is so desired. It will be understood that the poles of the generators are such that like currents will combine in the conductors.

Four alternate-current electric generators C' C² C³ C⁴ are shown as applied to this system. The alternate-current generator C' has its field-magnet coils connected, through a switch T', by conductors 9 and 10, with the conductors 3 and 4, respectively. These connections may be interrupted by moving the switch T'. In like manner the field-magnet coils of the alternate-current electric generator C² are connected with the conductors 3 and 4 through a switch T². The generators C³ and C⁴ have their field-magnet coils connected with the conductors 7 and 8 through switches T³ and T⁴, respectively. It will be seen thus that if the switch S be open and the switch S' closed, as also the switches T' and T², the field-magnet coils of the generators C' and C² will be connected in multiple arc with the exciter A'. By opening the switch T' or T² the corresponding generator will be cut out of circuit, and by opening the switch S' both generators will be disconnected. In like manner the connections between the exciter A² and generators C³ and C⁴ may be controlled, and in each instance the strength of current from the exciters may be regulated by the resistances $a$ and $a'$. In case it is desired, either exciter may be employed for supplying the field-magnet coils of all the generators C' C² C³ C⁴. This is accomplished by closing the switch S and then opening the switch S' or S². In this manner either exciter which is at any time in operation will be first connected in multiple arc with the other by means of the switch S and then the original exciter dropped out of circuit by opening the corresponding switch S' or S² without interrupting the operation of the system.

The generator C' has its respective poles connected by conductors 11 and 12 with binding-posts $e'$ and $f'$ upon a switch-board E'. The generator C² has its respective poles connected by conductors 13 and 14 with binding-posts $e^2$ and $f^2$ upon that switch-board, and in like manner the two generators C³ and C⁴ have their poles connected with binding-posts $e^3$ $f^3$ and $e^4$ $f^4$ upon a switch-board E². The connections from these several binding-posts are controlled by means of apparatus upon the respective switch-boards.

For the purpose of determining the current delivered by the several generators, each is supplied with a converter C, the primary coil of which is connected between conductors leading from its respective poles, as shown, and the secondary coil includes in its circuit an indicating device, such as a single incandescent electric lamp $d$. This serves as a pilot-light for indicating the operation of the corresponding machine.

We claim as our invention—

The combination, with two sources of mechanical energy and two continuous-current electric machines respectively driven thereby, of two pairs of alternate-current electric machines, circuits for connecting the field-magnet coils of either or both machines of said pairs with either or both said sources of continuous currents, whereby each field-magnet may be excited through the instrumentality of either source of mechanical energy, and independent circuits derived from each of the respective alternating-current machines, substantially as described.

In testimony whereof we have hereunto subscribed our names this 24th day of March, A. D. 1888.

OLIVER B. SHALLENBERGER.
HENRY M. BYLLESBY.

Witnesses:
THOMAS B. KERR,
DANL. W. EDGECOMB.